United States Patent
Su et al.

(10) Patent No.: US 8,670,764 B2
(45) Date of Patent: Mar. 11, 2014

(54) WIRELESS COMMUNICATION SYSTEMS AND METHODS FOR PROCESSING HANDOVER MESSAGES THEREOF AND COMPUTER PROGRAM PRODUCTS THEREOF

(75) Inventors: Yi-Syuan Su, Chiayi (TW); Min-Hsiung Hsu, Fuxing Township (TW); Yu-Ching Hsu, Zhudong Township (TW)

(73) Assignee: Industrial Technology Research Institute, Chutung (TW)

( * ) Notice: Subject to any disclaimer, the term of this patent is extended or adjusted under 35 U.S.C. 154(b) by 57 days.

(21) Appl. No.: 13/149,245

(22) Filed: May 31, 2011

(65) Prior Publication Data
US 2012/0149377 A1 Jun. 14, 2012

(30) Foreign Application Priority Data
Dec. 8, 2010 (TW) ................................ 99142761 A

(51) Int. Cl.
*H04W 36/00* (2009.01)
(52) U.S. Cl.
USPC .......................................... 455/438; 455/442
(58) Field of Classification Search
USPC .......................................... 455/436, 438, 442
See application file for complete search history.

(56) References Cited

U.S. PATENT DOCUMENTS

| | | | |
|---|---|---|---|
| 5,459,727 A | 10/1995 | Vannucci | |
| 5,513,184 A | 4/1996 | Vannucci | |
| 7,151,944 B2 | 12/2006 | Hashem et al. | |
| 7,277,410 B2 | 10/2007 | Horneman | |
| 7,353,025 B2 | 4/2008 | Ahn et al. | |
| 7,594,010 B2 | 9/2009 | Dohler et al. | |
| 7,613,444 B2 | 11/2009 | Lindqvist et al. | |
| 2008/0165736 A1 | 7/2008 | Zhao et al. | |
| 2009/0005099 A1 | 1/2009 | Jung et al. | |
| 2009/0097448 A1 | 4/2009 | Vasudevan et al. | |
| 2009/0168726 A1 | 7/2009 | Thalanany et al. | |
| 2009/0310559 A1 | 12/2009 | Chen et al. | |
| 2009/0310568 A1 | 12/2009 | Chen et al. | |
| 2009/0312019 A1 | 12/2009 | Chen et al. | |
| 2009/0312024 A1 | 12/2009 | Chen et al. | |

(Continued)

FOREIGN PATENT DOCUMENTS

| | | |
|---|---|---|
| TW | 200934267 | 8/2009 |
| TW | 200935942 | 8/2009 |

(Continued)

*Primary Examiner* — Sam Bhattacharya
(74) *Attorney, Agent, or Firm* — Wang Law Firm, Inc.; Li K. Wang; Stephen Hsu

(57) ABSTRACT

Methods for processing messages in a wireless communication system including a femto network (FN) including at least one Home NodeB, a core network (CN), a macro network (MN) including a serving base station and a gateway located between the FN and the CN is provided. First, a handover request is received from the Home NodeB or a server of the CN when two mobile devices are communicating. When the handover request is received from the Home NodeB, the gateway transmits a call setup request to the CN to setup a first call path between the gateway and the CN according to the handover request, transmits the handover request to the CN through the first call path to obtain a second call path from the CN to the FN and directs the server to perform the handover request according to the first call path and the second call path.

19 Claims, 6 Drawing Sheets

(56) References Cited

U.S. PATENT DOCUMENTS

| | | |
|---|---|---|
| 2010/0027510 A1 | 2/2010 | Balasubramanian et al. |
| 2010/0048216 A1 | 2/2010 | Sundarraman et al. |
| 2010/0093354 A1 | 4/2010 | Agashe et al. |
| 2010/0113027 A1 | 5/2010 | Hsu |
| 2010/0128694 A1 | 5/2010 | Choi-Grogan |
| 2010/0128697 A1 | 5/2010 | Choi-Grogan |
| 2010/0130212 A1 | 5/2010 | So et al. |
| 2011/0069674 A1* | 3/2011 | Oswal et al. ............ 370/331 |

FOREIGN PATENT DOCUMENTS

| | | |
|---|---|---|
| TW | 200937975 | 9/2009 |
| TW | 201004413 | 1/2010 |
| TW | 201006275 | 2/2010 |
| TW | 201012257 | 3/2010 |
| TW | 201018281 | 5/2010 |
| TW | 201019750 | 5/2010 |
| TW | 201019751 | 5/2010 |
| TW | 201019767 | 5/2010 |

* cited by examiner

| Iu connection ID for Femto UE | The other side BCD number | RAB ID for Femto UE |
|---|---|---|
| 510 | 520 | 530 |

| Iu connection ID for Femto UE | The other side BCD number | RAB ID for Femto UE | Iu connection ID for hand-in UE | RAB ID for hand-in UE |
|---|---|---|---|---|
| 510 | 520 | 530 | 540 | 550 |

WIRELESS COMMUNICATION SYSTEMS AND METHODS FOR PROCESSING HANDOVER MESSAGES THEREOF AND COMPUTER PROGRAM PRODUCTS THEREOF

CROSS REFERENCE TO RELATED APPLICATIONS

This Application claims priority of Taiwan Patent Application No. 099142761, filed on Dec. 8, 2010, the entirety of which is incorporated by reference herein.

BACKGROUND OF THE INVENTION

1. Field of the Invention

The disclosure relates generally to wireless communication systems and methods for processing handover messages thereof, and more particularly, to methods and systems for processing handover messages of wireless communication systems that includes a femtocell and a macrocell to achieve seamless handover between the femtocell and the macrocell and implement a local call switch function.

2. Description of the Related Art

Universal Mobile Telecommunications System (UMTS) is one of the third generation (3G) mobile communication technologies, which is evolved from Global System for Mobile communication (GSM), and it mainly adopted the use of GSM core network (referred to as CN) and a new Wideband Code Division Multiple Access (WCDMA) technology to provide user higher wireless transmission rate and better mobile services. In order to be able to provide a more simple communication environment and excellent communication quality in the home or business office environment, the concept of femtocell (also known as home base station) has been proposed.

Femtocells or so-called home base stations are designed to take advantage of a broadband cable network services in a small company or home to improve the problem of poor coverage, which utilizes the femtocell base station (HomeNode B, hereinafter referred to as HNB) as the near end of the wireless access network, and the broadband cable networks to connect to the core network of a ISP at its back end, to provide the user equipment (hereinafter referred to as UE) to access mobile internet services including circuit switching and packet switching services via the femtocell base stations (Femto AP or HNB). HNB may be designed simpler than most of general base stations, using less power, whether from the outdoor to indoor, or indoor to outdoor, only the same UE may be utilized, without complicated device switching or mode switching operations. In addition, the HNB may further effectively reduce the overhead and spectrum resources of the external base stations since the transmission overhead from the home and office users can be distributed to various femto base stations or femto access points (FAPs). Because most of the HNB applications may be applied in the home and enterprise, a local call switch function based on the femtocell and base station is derived. Through the local call switch function, the communication between two UEs configured with same femto gateway can be directly transferred by the femto gateway, without the need to pass a signal to the core network behind of the femto gateway back end. Through the forwarding of the femto gateway, after a voice connection is established, voice streams of the users may be directly exchanged in the femto gateway, thus not entering the core network for processing, so that data packets do not enter the core network. Therefore, the overhead of core network can be reduced.

However, a handover operation may be performed for the 3G system user due to fading in signal, so in the implementation of local call switch in the femtocell, the following two problems may be encountered.

First, when using the local call switch function, the control message of call setup will not enter the core network, so when the local call switch function is enabled, due to the core network does not contain information about the call, if the user needs to handover to the macro network (Referred to as MN) of the base station, a call interrupt phenomenon may be occurred. In addition, if a femtocell user and a macro network user are communicating with each other and the macro network user moves into the scope of HNB to result in a handover to the femtocell to occur, although local call switch conditions is met, it can not use the local call switch function due to the call being established by the core network.

SUMMARY

Wireless communication systems and methods for processing messages in wireless communication systems are provided.

In one exemplary embodiment, a method for processing messages in a wireless communication system including a femto network, a gateway, a core network (CN) and a macro network is provided, wherein the gateway is located between the femto network and the core network, the femto network includes at least one Home NodeB and the macro network includes at least one serving base station. First, a handover request is received from the Home NodeB or a server of the core network at the time two mobile devices are communicating with each other. When the handover request is received from the Home NodeB, the gateway transmits a call setup request to the core network to setup a first call path between the gateway and the core network according to the handover request, the gateway transmits the handover request to the core network through the first call path to obtain a second call path from the core network to the macro network and the gateway directs the server to perform the handover request according to the first call path and the second call path. When the handover request is received from the server of the core network, a first mobile device is moved from the macro network to the femto network according to the handover request and the gateway activates a procedure to modify call resource such that the call path "the femto network to the gateway, further to the core network "is changed to the call path" the femto network to the gateway".

An exemplary embodiment of a wireless communication system comprises a femto network, a core network (CN), a macro network, at least two mobile devices and a gateway. The femto network comprises at least one Home NodeB, the core network comprises at least one server and the macro network comprises at least one serving base station. The at least two mobile devices are capable of communicating between the femto network and the macro network. The gateway is located between the femto network and the core network for receiving a handover request from the Home NodeB or a server of the core network during the two mobile devices are communication with each other, wherein when the handover request is received from the Home NodeB, the gateway transmits a call setup request to the core network to set up a first call path between the gateway and the core network according to the handover request, transmits the handover request to the core network through the first call path to obtain a second call path which is a call path from the core network to the macro network and directs the server to perform the handover request according to the first call path and the second call path; and when the handover request is received from the server of the core network, a first mobile device of two mobile devices is moved from the macro network to the femto network according to the handover request and the gateway activates a resource modification procedure to modify call resources such that the call path "the femto network to the gateway, further to the core network" is changed to the call path "the femto network to the gateway".

Methods for processing messages of wireless communication systems may take the form of a program code embodied in a tangible media. When the program code is loaded into and executed by a machine, the machine becomes an apparatus for practicing the disclosed method.

BRIEF DESCRIPTION OF THE DRAWINGS

The disclosure will become more fully understood by referring to the following detailed description with reference to the accompanying drawings, wherein:

FIGS. 5A and 5B are schematic diagrams illustrating exemplary embodiments of call information of the user database of the invention.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

The invention is now described with reference to FIGS. 1 through 6, which generally relate to message processing systems and methods for processing messages in a wireless communication network. In the following detailed description, reference is made to the accompanying drawings which form a part hereof, shown by way of illustration of specific embodiments. These embodiments are described in sufficient detail to enable those skilled in the art to practice the invention, and it is to be understood that other embodiments may be utilized and that structural, logical and electrical changes may be made without departing from the spirit and scope of the invention. The following detailed description is, therefore, not to be taken in a limiting sense. It should be understood that many of the elements described and illustrated throughout the specification are functional in nature and may be embodied in one or more physical entities or may take other forms beyond those described or depicted.

Exemplary embodiments of the invention provides message processing systems and methods for processing messages in a wireless communication network, which may design a mechanism for implementing a local call switch function in the femto gateway such that, when in the use of local call service, the call can still continue when the user is handing over to the base station and when the user is handed-over from the outdoor base station to the same HNB Gateway, the local call service can still be utilized. The embodiments of the invention adopt the existing standard procedures, only makes change on the femto gateway implementation and no change required for the existing femtocell architecture, and compatible with the standard can be achieved.

The embodiments of the invention propose two scenarios under femtocell architecture. One is a scenario that when a local network user performs a handover operation from the femtocell to the service network (hereinafter referred to as a Femto-to-Macro handover), through information exchanging between the femto gateway and core network, the Femto-to-Macro handover operation may be completed without breaking the communication in the handover process. The other is a scenario that when a macro network user performs a handover operation from the macro network to the femtocell (hereinafter referred to as a Macro-to-Femto handover), this call may be converted into a local call through the femto gateway.

Figure 1:
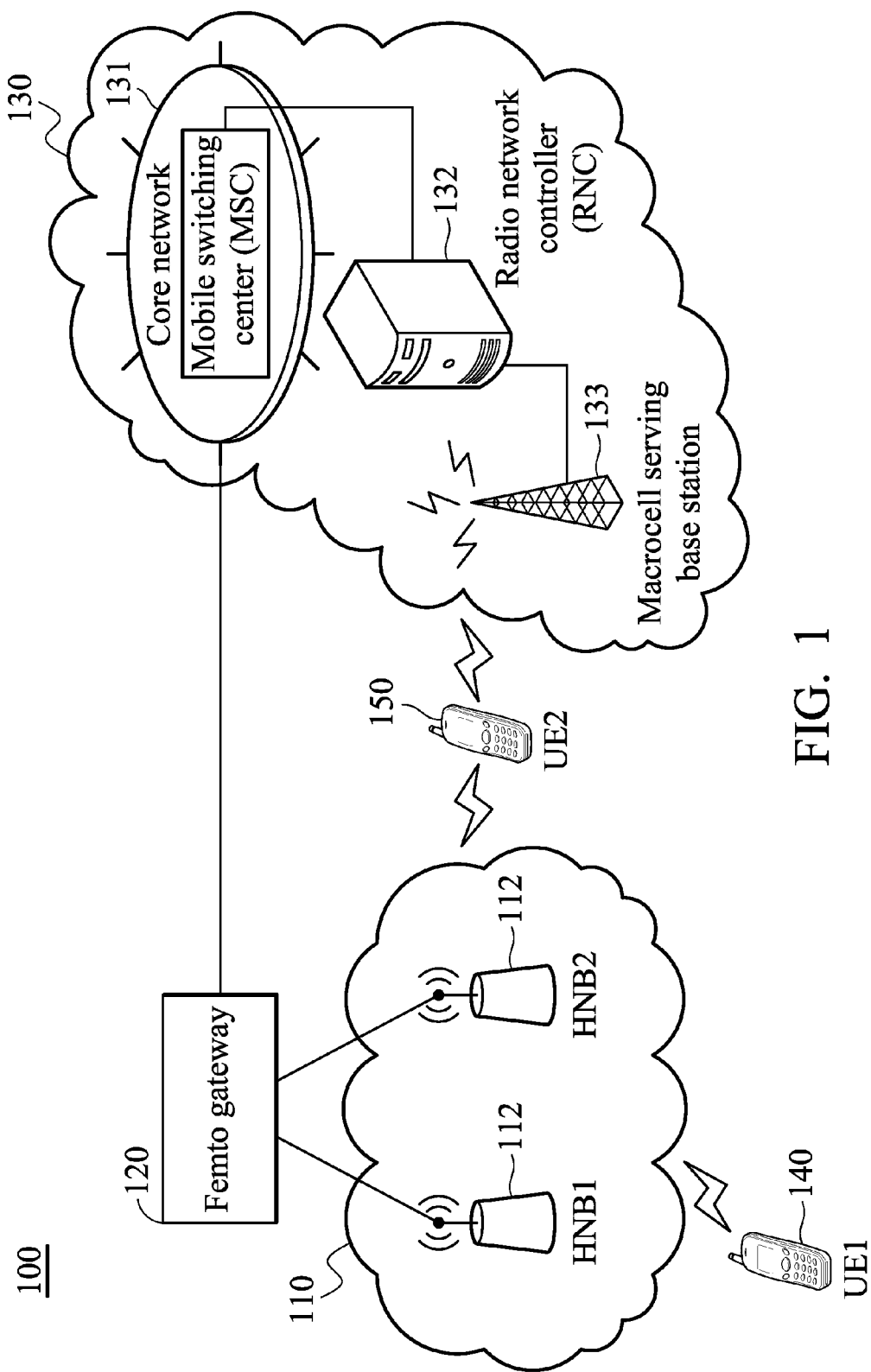
FIG. 1 is a schematic diagram illustrating an exemplary embodiment of a mobile communication system of the invention.

FIG. 1 is a schematic diagram illustrating an exemplary embodiment of a mobile communication system of the invention. As shown in FIG. 1, the mobile communication system 100 comprises a femtocell 110, a femto gateway (femtoGW) 120, a service network 130 and at least two UEs 140 and 150, wherein the femto gateway 120 is located between the femtocell 110 and the core network 131 for transferring the signal from the femtocell 110 to the core network 131 or from the core network 131 to the femtocell 110. The femtocell 110 may comprise one or more HNBs 112, each HNB 112 may provide mobile network services to the mobile devices or the UEs within scope of its signal coverage. The femto gateway may provide management to all of base stations in femtocell 110. For convenience of description, the UE in the femtocell 110 hereinafter will be referred to as a femtocell user. Note that the femtocell user under the same femto gateway is capable of performing the features of local call switch. For example, if the UEs 140 and 150 are in the coverage scope of the same femto gateway, the UEs 140 and 150 may perform local call switch features through the femto gateway 120 without providing signals to core network 131.

The service network 130 may comprise a core network 131, a radio network controller (RNC) 132 and one or more macrocell serving base stations 133. Similarly, each macrocell base station 133 may provide mobile network service to the user within the scope of its signal coverage. For convenience of description, the UE in the service network 130 hereinafter will be referred to as a macrocell user. The core network 131 may further comprise a server (generally called as a mobile switching center, MSC), for communication with the femto gateway and message exchange therebetween.

Assume that two femtocell users 140 and 150 are performing local call switch features through the femto gateway 120 for communication. Meanwhile, signal and data routing are sequentially transferred through the first HNB (HNB1), the femto gateway and the second HNB (HNB2) passing to the second UE (UE 2) from the first UE (UE1). The routing path of above-mentioned signal and data is represented as following: UE1→HNB1→Femto gateway (referred to as FGW) →HNB2→UE2. Note that the UE1 (e.g. the UE 140) may also be referred to as a mobile originated device, and the UE2

(e.g. the UE 150) may also be referred to as a mobile terminal device, and wherein, the HNB1 and HNB2 are two different HNBs under the same femto gateway, the UE1 is in the scope of service of the HNB1, the UE2 is in the scope of service of the HNB2. It is to be noted that, for illustration purpose, in this embodiment, two different network base stations are adopted as an example for explanation, that is, two UEs are under different HNBs, but the invention is not limited thereto. In other words, in some embodiments, the HNB2 may also be the HNB1, thus two UEs may under the same HNB.

In this embodiment, the femto gateway 120 may receive a handover request from a server of the HNB or the core network during a communication status between the UEs 140 and 150. When receiving a handover request from the HNB 112, the femto gateway 120 will send an call setup request to the core network 131 according to the handover request, for establishing a first call path between the femto gateway 120 and the core network 131, then the femto gateway 120 transmits the handover request to the core network 131 through the established first call path, acquires a second call path from the core network 131 to the macro network, thus the femto gateway 120 results the mobile switching center (MSC) performing handover request through the first and second call path. When the handover request is received from the server (MSC) of the core network, the UE1 in the macro network will switch to the femtocell 110 according to the handover request, and the femto gateway 120 will activate a resource modification procedure for modifying call resources for communication ends, such that the call path "the HNB 112 to the femto gateway 120, further to the core network 131 "is changed to the call path" the HNB 112 to the femto gateway 120.

It is to be noted that, for illustration purpose, the first UE (e.g. the UE 140) is used as a mobile-originated (MO) device and the second UE (e.g. the UE 150) is used as a mobile-terminal (MT) device and is an object of handover request in the following embodiment, but the invention is not limited thereto. In other embodiments, the first UE or the second UE may alternatively be mobile-originated (MO) device and mobile-terminal (MT) device, and both the first UE and second UE may be an object of handover request.

At the time when one of the femtocell users that is in a talking state leaves the service scope of the femto gateway 120, the HNB 112 may determine to performing the handover operation according to Radio Resource Control (RRC) Measurement Report of this user and sends a Relocation Required message of Radio Access Network Application Part (Abbreviated as RANAP) to the femto gateway 120. Note that RRC may be used for performing wireless resource message interchange, wireless resource setting control, QoS control, channel transmission format setting control, packet disassembling and assembling process control, and Non Access Stratum (NAS) communication protocol transmission process etc, in aid for the UE end RRC and network end to perform message exchange to serve as a basis for wireless resource setting. In addition, there are also various service statuses designed in RRC, to slow down the power consumption of the mobile phone, and lead to more efficient utilization of the system wireless resources. RANAP is the signaling protocol of Iu/Iuh, including control information regulated for all wireless network layers. In this embodiment, the HNB 112 may determine whether the user under it has left its coverage scope according to the RRC measurement report of its user, and may transmit a handover request to the femto gateway 120 when determining that the user has left its coverage.

It is to be understood that, because the execution of local call switch function is performed by performing a call control through the femto gateway 120, rather than through the core network, there is no related information and reserved resources of this communication in the core network. However, after the handover operation has been completed, the call control and all related information must route through the core network. Therefore, the handover message processing method of the embodiment of the invention may firstly set up the connection between the femto gateway 120 and the core network, to ensure that the original communication will not be interrupted because of handover.

Figure 2:
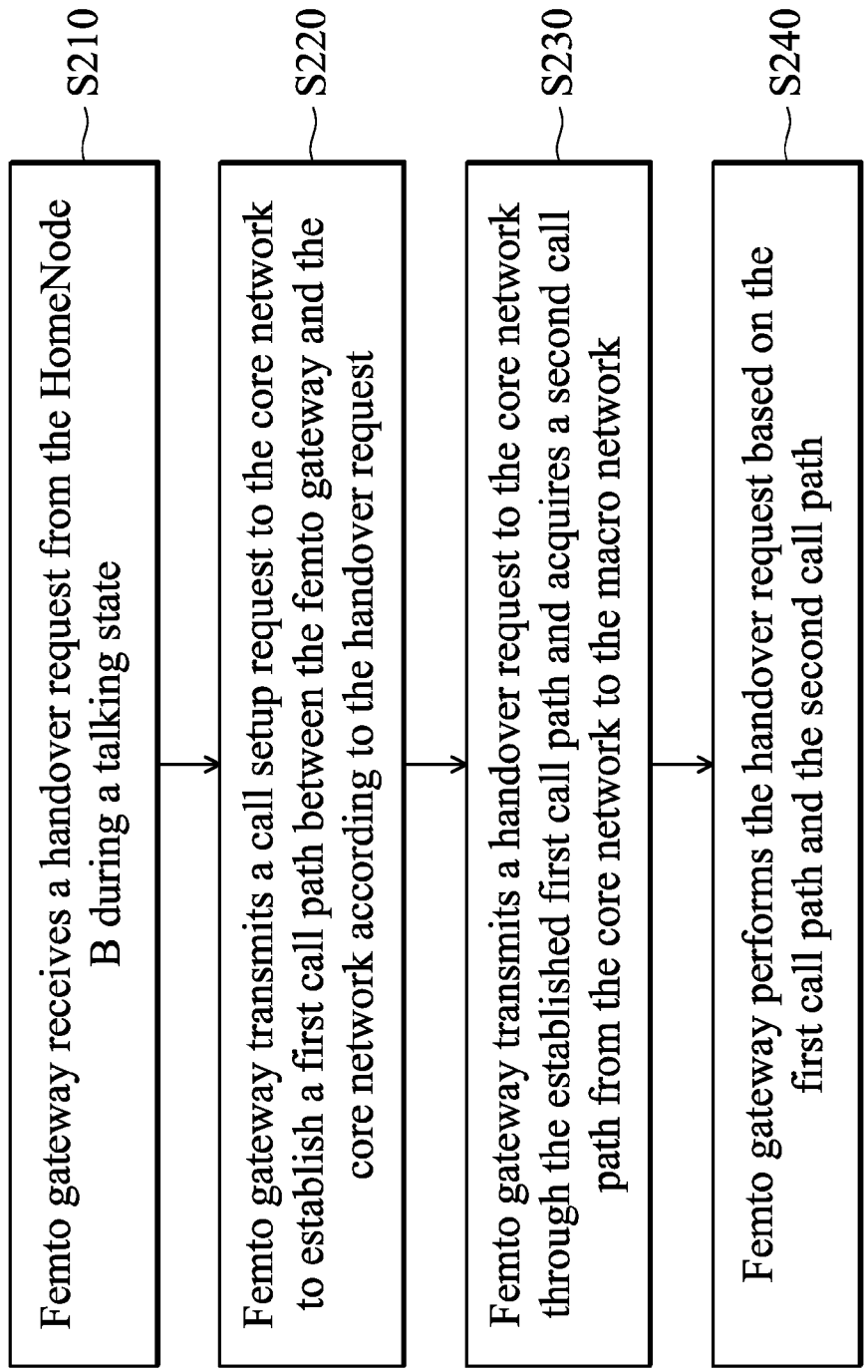
FIG. 2 is a flowchart of a method for processing messages in a wireless communication system according to an embodiment of the invention.

Please refer to FIG. 1 and FIG. 2. FIG. 2 is a flowchart of a method for processing messages in a wireless communication system according to an embodiment of the invention.

First, in step S210, a handover request is received from the HNB in a talking state. When a femtocell user of an end of a communication has a handover from the femtocell to the service network, the femto gateway 120 will receive a handover request from the HNB, namely the femtocell to macrocell handover operation. Similarly, when a femtocell user is in communication with a service network user and the service network user has a handover from the service network to the femtocell, the femto gateway 120 will receive a handover request from a server of the core network, namely the macrocell to femtocell handover operation.

In step S220, the femto gateway 120 transmits a call setup request to the core network for establishing a first call path between the femto gateway 120 and the core network according to the handover request. In this step, the femto gateway 120 represents Mobile-Originated (abbreviated as MO) and Mobile Terminal (abbreviated as MT) to initiate the call setup procedure to the server (MSC) of the core network respectively for establishing connection between the femto gateway 120 and the core network (i.e. the first call path). At this time, the call control of MO and MT will be performed by the femto gateway 120.

Thereafter, in step S230, the femto gateway 120 transmits a handover request to the core network through the established first call path and thus acquires a second call path from the core network to the macro network. In this step, when the call setup procedure of MO/MT between the server of core network (MSC) and the femto gateway 120 is completed, the femto gateway 120 may further modify the handover request message sent by the HNB and transfer it to the MSC, to acquire a second call path from the core network to the macro network. Wherein, the modification portion is the fields of resource identification code (RAB ID) included in the handover request message and the modifying method is to change the value in the RAB ID from the RAB ID for the HNB to femto gateway, to the RAB ID for the femto gateway to the MSC. Subsequently, the core network will notify the corresponding target radio network server (RNS) in the core network to complete subsequent handover processes. Thus, in step S240, the femto gateway 120 may perform the handover request based on the first call path and the second call path.

Figure 3:
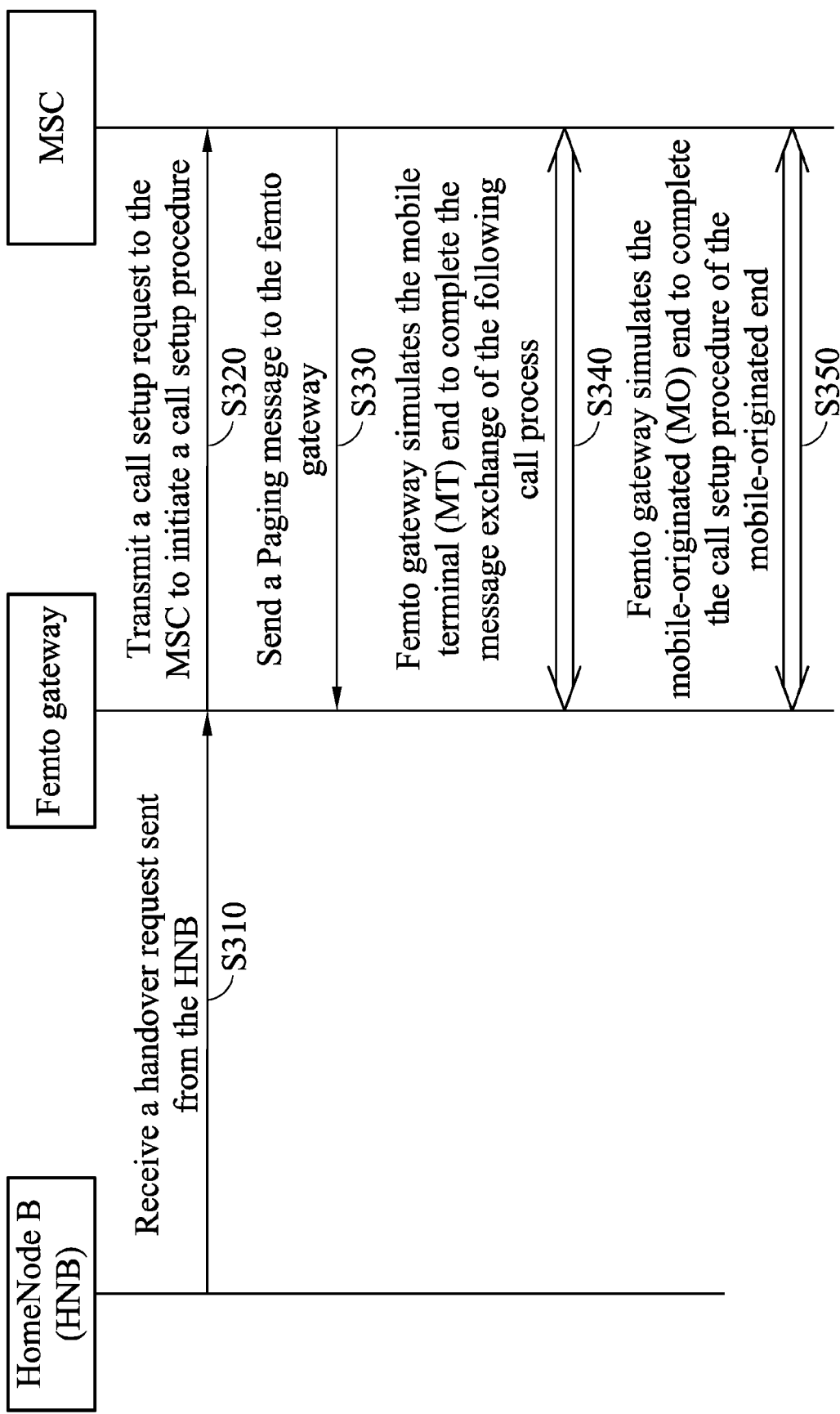
FIG. 3 is a message sequence chart of a call setup procedure performed by the gateway of the femto network according to an embodiment of the invention.
Figure 4:
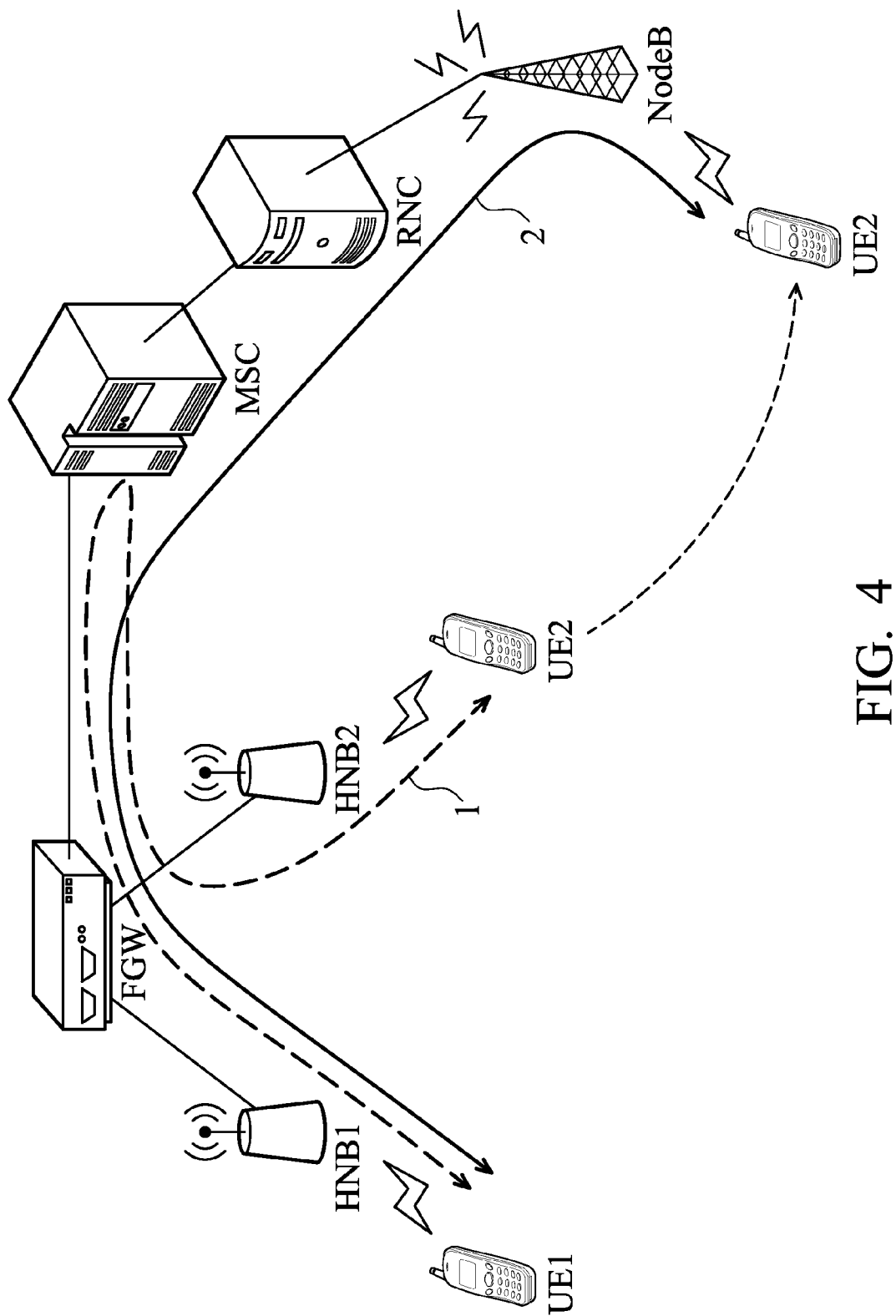
FIG. 4 is a schematic diagram illustrating an exemplary embodiment of a call path and routing paths of messages and data of the invention.

FIG. 3 is a message sequence chart of a call setup procedure performed by the femto gateway 120 according to an embodiment of the invention. At first, after the handover request sent from the HNB 112 received by the femto gateway 120 (step S310), according to the received message, the femto gateway 120 transmits a call setup request to the MSC to initiate call setup procedure (step S320). After the call setup request has received, the MSC sends a Paging message to the femto gateway (step S330). Subsequently, the femto gateway may simulate the role of a MT to complete the message exchange of the following call process (step S340). Similarly, the femto gateway 120 also has to simulate the role of MO to complete the call setup procedure of the MO end (step S350).

After the call setup process of MO and MT have been completed, the call control for the MO and MT will be switched to be performed by the MSC of the core network.

After above-mentioned steps have been performed, subsequent call control operation will be switched from the femto gateway 120 to the MSC to perform. Therefore, the call path followed will be changed to: UE1→HNB1→FGW→MSC→FGW→HNB2→UE2 (as shown with dotted line in FIG. 4).

When the call setup process of MO/MT between the femto gateway and the MSC have been completed, the femto gateway 120 may further modify the handover request message transmitted from HNB and then transfers it to the MSC as aforementioned.

After the user has completed the handover operation, the MSC will initiate an Iu Release process to the femto gateway 120, to release the connection between the UE and the femto gateway 120 established prior to handover. The femto gateway 120 has to transfer the related message of this process to the HNB to complete subsequent processes. Therefore, the call path followed and the message and data routing path will be changed to: UE1→HNB1→femto gateway→MSC→NodeB→UE2 as shown with the routing 2 in FIG. 4.

In some embodiments, when a service network user and a femtocell user are in communication and the service network user enters the coverage scope of the femto gateway 120 to cause a handover occurred, user information for the other side of the communication is not included in the handover procedure, and thus the related calling information must be recorded in the femto gateway 120 during call setup stage. Therefore, the handover message processing system for use in a wireless communication network and message processing method thereof of the embodiment of the invention may further comprise a user database in the femto gateway 120, which keeps the related calling information of authorized user within the femto gateway 120 in the records. The user database may record the international mobile subscriber identity (IMSI) value and corresponding telephone number. The user database may also record those who are in communicating status under the same femto gateway 120. As shown in FIG. 5A, the call information 500 in the user database at least comprises an Iu connection ID for Femto UE field 510, a the other side BCD number field 520, and a RAB ID for femto UE field 530, in which the Iu connection ID for Femto UE field 510 is used for identifying the user of the record, the other side BCD number field 520 represents the telephone number of the other side of the communication, and the RAB ID for femto UE field 530 represents the code of applied or reserved resource for the user (e.g. a type or a size of bandwidth). Therefore, through this call information, the femto gateway 120 is capable of determining whether the user of a service network is communicating with any user under itself. Subsequently, please refer to FIG. 1 and FIG. 6.

Figure 6:
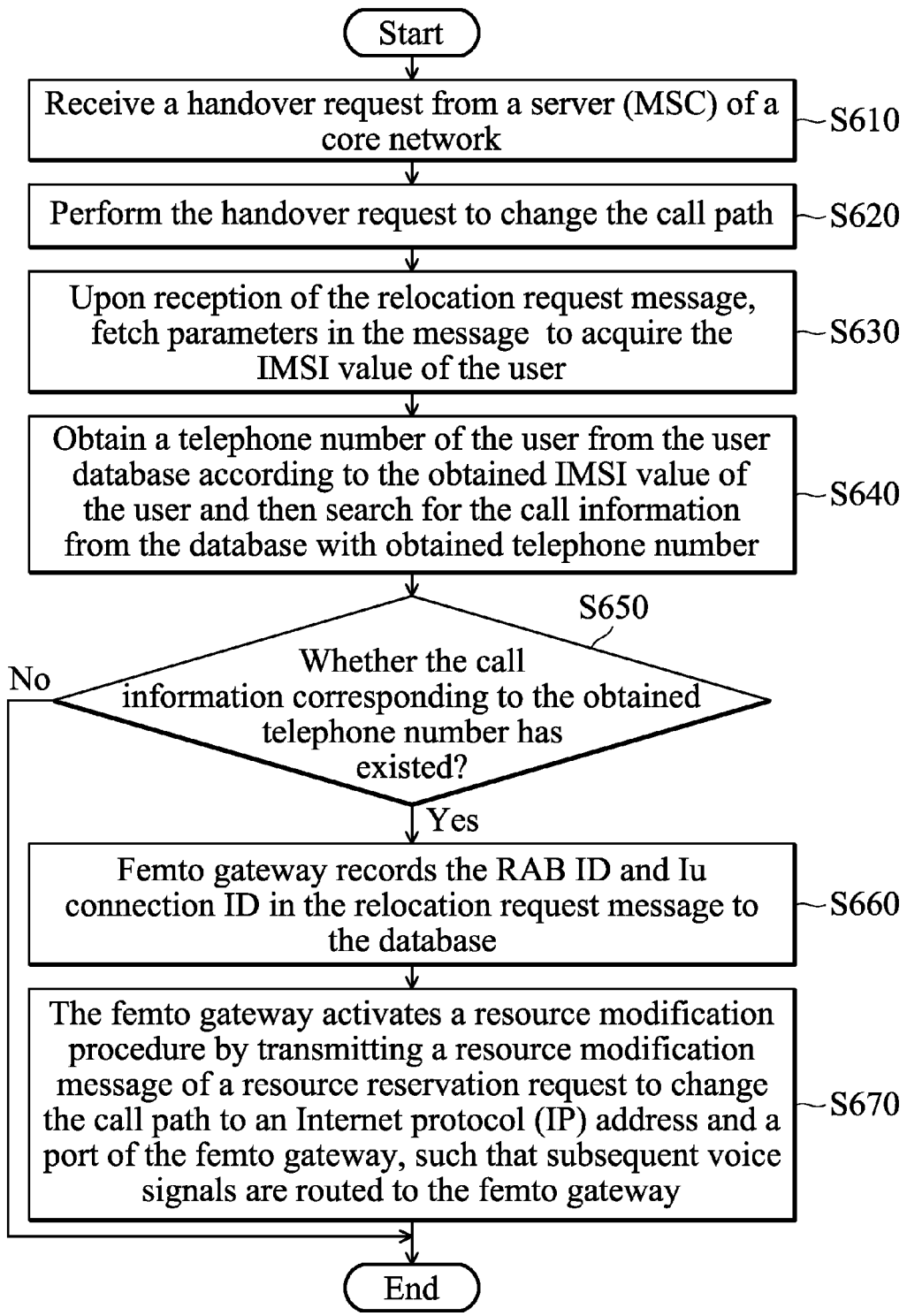
FIG. 6 is a flowchart of a method for processing messages in a wireless communication system according to another embodiment of the invention.

FIG. 6 is a flowchart of a method for processing messages in a wireless communication system according to another embodiment of the invention. The method for processing messages in a wireless communication system of the invention can be applied to the femto gateway 120. In this embodiment, assuming that a femtocell user and a service network user are in communicating status. In step S610, when the service network user has a handover from the service network to the femtocell, the femto gateway 120 receives a handover request from a server of a core network (i.e. MSC). This handover request also named as macro to femto handover operation.

Thereafter, in step S620, the handover request is performed to change the call path. In this step, the routing path of message and audio will be changed to: UE1→HNB1→FGW→MSC→FGW→HNB2→UE2.

Because the user information of the other side of communication of the user may not included in the handover procedure during the handover procedure is being performed, the related call information must be recorded to the femto gateway 120 during the call setup stage in which the content recorded is as same as that shown in FIG. 5A.

In step S630, when receiving the relocation request message, the femto gateway 120 first fetches parameters in the message (e.g. fetch parameter IE of Permanent NAS UE Identity in the message) to acquire the IMSI value of the user, obtains the telephone number of the user from the user database, and then searches the call information 500 from the database in FIG. 5A with obtained telephone number (step S640). Thereafter, in step S650, the femto gateway 120 determines whether the call information corresponding to the obtained telephone number has existed in the database. If not (No in step S650), which represents that none of the users under the femto gateway 120 is communicating with the user with this telephone number, then the flow ends. If the aforementioned telephone number can be found existed in the database (Yes in step S650), which represents that someone of the users under the femto gateway 120 is communicating with the user with this telephone number, the femto gateway 120 records the RAB ID and Iu connection ID in the relocation request message to the database, and change the call information 500 shown in FIG. 5A to a call information 500' as shown in FIG. 5B (step S660). As shown in FIG. 5B, in addition to aforementioned Iu connection ID for Femto UE field 510, the other side BCD number field 520 and the RAB ID for femto UE field 530 in FIG. 5A, the call information 500' in the user database further added a Iu connection ID for hand-in UE field 540, and a RAB ID for hand-in UE field 550, for recording the call information of the user who is hand-in during the relocation process. Similarly, the Iu connection ID for hand-in UE field 540 is used for identifying the user of the record, and the RAB ID for hand-in UE field 550 represents the code of applied or reserved resource for the user (e.g. a type or a size of bandwidth). Next, the femto gateway 120 activates a resource modification procedure by transmitting a resource modification message of a resource reservation request to change the call path to an Internet protocol (IP) address and a port of the femto gateway 120, such that subsequent voice signals routes to the femto gateway 120 (step S670) instead of the core network 131. Therefore, the femto gateway 120 may further switch this call to a local call according to the call information, thereby reducing the overhead of core network.

Therefore, the femto gateway 120 may further determine whether the service network user is in communication status with the femtocell user based on the recorded call information in the database, and if so, the femto gateway 120 transmits a resource modification message of a resource reservation request to change the call path to the IP address and the port of the femto gateway 120 such that subsequent voice signals can be routed to the femto gateway 120.

For example, the femto gateway 120 may transmit RAB Assignment Request (MODIFY) messages to two users separately to notify those two users to change the original call path from IP and port of the MSC to IP and port of the femto gateway 120, such that subsequent voice signals can be routed to the femto gateway 120 in stead of the MSC. Note that the RAB ID related information of those two users can be obtained from the call information 500' of the database shown in FIG. 5B.

When receiving the resource modification message from the femto gateway 120, the UE user modifies the call path from the IP and port of the MSC to IP and port of the femto gateway 120 according to the instruction in the parameters of the resource modification information, and upon completion of modification, transmits a RAB Assignment Response message to the femto gateway 120 to indicate the completion of modification.

In some embodiments, after the RAB Assignment Response of an user is received by the femto gateway 120, assuming that the user who has responded this RAB Assignment Response message as user A and the un-responded one as user B. For implementing the local call switch function, subsequently, the packet decapsulation and re-routing procedure in the user plane level must be performed.

When the audio data is sent from the user A to the user B, because the user B deeded that the server MSC of the core network is the transmission end, the femto gateway 120 must rewrite the IP address and port of every protocol layer of the communication protocol in the packets sending from the user A to the user B, to the IP address and port of the MSC.

Contrarily, when the audio data is sent from the user B to the user A, the femto gateway 120 intercepts and decapsulates the packets and obtains the contents, reassembles the packets at Iu-UP layer, sets the sending end to the femto gateway 120 and the receiving end to the HNB where the user A located, such that the call communication of the two users can be continued without the audio data going through the core network.

Thereafter, when the resource modification response message responded from the user B is received, which represents the call path of two users has been changed to the IP and port of the femto gateway 120, such that such that subsequent voice signals can be routed to the femto gateway 120 in stead of the MSC, therefore, there will be no need for the femto gateway 120 to further perform aforementioned decapsulation and modification on the packets, only transferring role need to be performed. Through above-mentioned steps, in addition to handover to the femtocell, the user also changed the call to local call switch function. At the same time, the connection reserved for communication between the femto gateway 120 and the MSC still remain existed, therefore, the femto gateway 120 must initiate a call release procedure to the MSC by simulating a role of the user, to release the connection between the femto gateway 120 and the MSC.

In summary, according to systems and methods for processing messages in a wireless communication system of the invention, by the call control of the femto gateway, the Femto-to-Macro handover operation can be performed without interruption for a local call switch function enabled environment when the femto gateway has received a handover request sent by the HNB under the femto gateway. In addition, according to the methods for processing messages in a wireless communication system of the invention, when the user under a femtocell is communicating with an external base station user and the external base station user has handed-in to the coverage scope of femtocell at the same time, a local call switch function can be provided to change the call between the femto user and the macro user to a local call based on the call information stored in the femto gateway, thereby effectively reducing the overhead of the base station of external service network.

Wireless communication systems and methods for processing handover messages thereof, or certain aspects or portions thereof, may take the form of a program code (i.e., executable instructions) embodied in tangible media, such as floppy diskettes, CD-ROMs, hard drives, or any other machine-readable storage medium, wherein, when the program code is loaded into and executed by a machine, such as a computer, the machine thereby becomes an apparatus for practicing the methods. The methods may also be embodied in the form of a program code transmitted over some transmission medium, such as electrical wiring or cabling, through fiber optics, or via any other form of transmission, wherein, when the program code is received and loaded into and executed by a machine, such as a computer, the machine becomes an apparatus for practicing the disclosed methods. When implemented on a general-purpose processor, the program code combines with the processor to provide a unique apparatus that operates analogously to application specific logic circuits.

While the disclosure has been described by way of example and in terms of exemplary embodiment, it is to be understood that the invention is not limited thereto. Those who are skilled in this technology can still make various alterations and modifications without departing from the scope and spirit of this disclosure. Therefore, the scope of the present disclosure shall be defined and protected by the following claims and their equivalents.

What is claimed is:

1. A method for processing messages in a wireless communication system including a femto network, a gateway, a core network (CN) and a macro network, wherein the gateway is located between the femto network and the core network, the femto network comprises at least one Home NodeB and the macro network comprises at least one serving base station, the method comprising:
   receiving a handover request from the Home NodeB or a server of the core network during two mobile devices are communication with each other;
   when the handover request is received from the Home NodeB, transmitting, by the gateway, a call setup request to the core network to set up a first call path between the gateway and the core network according to the handover request, transmitting the handover request to the core network to obtain a second call path which is a call path from the core network to the macro network and directing the server to perform the handover request according to the first call path and the second call path; and
   when the handover request is received from the server of the core network, moving a first mobile device of two mobile devices from the macro network to the femto network according to the handover request and activating, by the gateway, a resource modification procedure to modify call resources such that the two mobile devices are in communication with each other based on a call path from the femto network to the gateway without communicating through the core network.

2. The method as claimed in claim 1, further comprising:
   after completing the execution of handover request, the gateway further informs the Home NodeB corresponding to the hand-overed mobile device to release resources reserved therefore.

3. The method as claimed in claim 1, wherein the step of transmitting, by the gateway, a call setup request to the core network to set up a first call path between the gateway and the core network according to the handover request further comprises:
   the gateway simulating a mobile-originated (MO) device to initialize a call setup procedure with the core network; and the gateway simulating a mobile-terminal (MT) device to complete the call setup procedure with the core network.

4. The method as claimed in claim 3, further comprising:
after completing the call setup procedure, the gateway modifying contents of the handover request which is received from the Home NodeB to forward the handover request to the server.

5. The method as claimed in claim 1, further comprising:
receiving a connection release request from the server of the core network; and
the gateway releasing the connection between the handovered mobile device and the gateway in response to the connection release request.

6. The method as claimed in claim 1, further comprising:
after the first mobile device moved to the femto network in response to the handover request and the execution of the handover request has completed, the gateway intercepting packets to be transmitted to the first mobile device from the server and forwarding the packets to the first mobile device.

7. The method as claimed in claim 1, wherein the gateway further comprises a database, wherein the database records call information in the gateway, and the method further comprises:
determining whether the first mobile device which is from the macro network and a second mobile device of the femto network are in a talking state according to the call information of the database; and
when determining that the first mobile device which is from the macro network and the second mobile device of the femto network are in the talking state, the gateway transmitting a resource modification message of a resource reservation request to the first mobile device and the second mobile device to direct the call path to change to an Internet protocol (IP) address and a port of the gateway so as to forward subsequent voice signals to the gateway.

8. The method as claimed in claim 7, wherein the step of determining whether the first mobile device which is from the macro network and the second mobile device of the femto network are in the talking state is performed by determining whether an identification code of the first mobile device is exist in the database.

9. The method as claimed in claim 1, further comprising:
the gateway further performing a packet decapsulation and re-routing procedure if a resource modification reply message is not received.

10. A wireless communication system, comprising:
a femto network comprising at least one Home NodeB;
a core network (CN) comprising at least one server;
a macro network comprising at least one serving base station;
at least two mobile devices capable of communicating between the femto network and the macro network; and
a gateway located between the femto network and the core network, receiving a handover request from the Home NodeB or a server of the core network during the two mobile devices are communication with each other, wherein when the handover request is received from the Home NodeB, the gateway transmits a call setup request to the core network to set up a first call path between the gateway and the core network according to the handover request, transmits the handover request to the core network to obtain a second call path which is a call path from the core network to the macro network and directs the server to perform the handover request according to the first call path and the second call path; and when the handover request is received from the server of the core network, a first mobile device of two mobile devices is moved from the macro network to the femto network according to the handover request and the gateway activates a resource modification procedure to modify call resources such that the two mobile devices are in communication with each other based on a call path from the femto network to the gateway without communicating through the core network.

11. The wireless communication system as claimed in claim 10, wherein the gateway further informs the Home NodeB corresponding to the hand-overed mobile device to release resources reserved therefore after the execution of handover request has completed.

12. The wireless communication system as claimed in claim 10, wherein the gateway further simulates a mobile-originated (MO) device to initialize a call setup procedure with the core network and then simulates a mobile-terminal (MT) device to complete the call setup procedure with the core network.

13. The wireless communication system as claimed in claim 12, wherein the gateway further modifies contents of the handover request which is received from the Home NodeB to forward the handover request to the server after the call setup procedure has completed.

14. The wireless communication system as claimed in claim 10, wherein the gateway further receives a connection release request from the server of the core network and releases the connection between the hand-overed mobile device and the gateway in response to the connection release request.

15. The wireless communication system as claimed in claim 10, when the gateway further intercepts packets to be transmitted to the first mobile device from the server and forwards the packets to the first mobile device after the first mobile device moved to the femto network in response to the handover request and the execution of the handover request has completed, the gateway.

16. The wireless communication system as claimed in claim 10, wherein the gateway further comprises a database, wherein the database records call information in the gateway, and the gateway further determines whether the first mobile device which is from the macro network and a second mobile device of the femto network are in a talking state according to the call information of the database, and if so, transmits a resource modification message of a resource reservation request to the first mobile device and the second mobile device to direct the call path to change to an Internet protocol (IP) address and a port of the gateway so as to forward subsequent voice signals to the gateway.

17. The wireless communication system as claimed in claim 16, wherein the gateway determines whether the first mobile device which is from the macro network and the second mobile device of the femto network are in the talking state by determining whether an identification code of the first mobile device is exist in the database.

18. The wireless communication system as claimed in claim 10, wherein the gateway further performs a packet decapsulation and re-routing procedure if a resource modification reply message is not received.

19. A non-transitory machine-readable storage medium comprising a computer program, which, when executed, causes an apparatus to perform a method for processing messages in a wireless communication system including a femto network, a gateway, a core network (CN) and a macro network, wherein the gateway is located between the femto network and the core network, the femto network comprises at least one Home NodeB and the macro network comprises at least one serving base station, comprising:
  receiving a handover request from the Home NodeB or a server of the core network during two mobile devices are communication with each other;
  when the handover request is received from the Home NodeB, transmitting, by the gateway, a call setup request to the core network to set up a first call path between the gateway and the core network according to the handover request, transmitting the handover request to the core network to obtain a second call path which is a call path from the core network to the macro network and directing the server to perform the handover request according to the first call path and the second call path; and
  when the handover request is received from the server of the core network, moving a first mobile device of two mobile devices from the macro network to the femto network according to the handover request and activating, by the gateway, a resource modification procedure to modify call resources such that the two mobile devices are in communication with each other based on a call path from the femto network to the gateway without communicating through the core network,
  wherein a packet decapsulation and re-routing procedure is further performed during the execution of the resource modification procedure.

* * * * *